(12) United States Patent
Krishnan et al.

(10) Patent No.: US 7,324,695 B2
(45) Date of Patent: Jan. 29, 2008

(54) PRIORITIZED IMAGE VISUALIZATION FROM SCALABLE COMPRESSED DATA

(75) Inventors: Karthik Krishnan, Clifton Park, NY (US); Michael Wesley Marcellin, Tuscon, AZ (US); Mariappan S. Nadar, Plainsboro, NJ (US); Arun Krishnan, Exton, PA (US)

(73) Assignees: Seimens Medical Solutions USA, Inc., Malvern, PA (US); Arizona Board of Regents on behalf of The Universtiy of Arizona, Tucson, AZ (US)

(*) Notice: Subject to any disclaimer, the term of this patent is extended or adjusted under 35 U.S.C. 154(b) by 419 days.

(21) Appl. No.: 11/057,977

(22) Filed: Feb. 15, 2005

(65) Prior Publication Data

US 2006/0031372 A1 Feb. 9, 2006

Related U.S. Application Data

(63) Continuation-in-part of application No. 10/100,154, filed on Mar. 18, 2002, now Pat. No. 7,190,836.

(60) Provisional application No. 60/545,550, filed on Feb. 17, 2004.

(51) Int. Cl.
G06K 9/36 (2006.01)
G06K 9/00 (2006.01)

(52) U.S. Cl. .................................... 382/232

(58) Field of Classification Search ............... 382/128, 382/154, 162, 166, 168, 214, 232, 233, 240, 382/243, 250, 253; 341/51, 87, 106, 107; 375/240.11, 240.16; 709/231, 247, 249; 711/105; 370/401
See application file for complete search history.

(56) References Cited

U.S. PATENT DOCUMENTS

| | | | | |
|---|---|---|---|---|
| 5,854,889 | A * | 12/1998 | Liese et al. | 714/43 |
| 6,453,356 | B1 * | 9/2002 | Sheard et al. | 709/231 |
| 6,804,403 | B1 * | 10/2004 | Wang et al. | 382/240 |
| 7,110,617 | B2 * | 9/2006 | Zhang et al. | 382/284 |
| 7,129,860 | B2 * | 10/2006 | Alvarez et al. | 341/51 |
| 2001/0054131 | A1 * | 12/2001 | Alvarez et al. | 711/105 |
| 2003/0035478 | A1 * | 2/2003 | Taubman | 375/240.11 |
| 2003/0058873 | A1 * | 3/2003 | Geiger et al. | 370/401 |

* cited by examiner

Primary Examiner—Amir Alavi
(74) Attorney, Agent, or Firm—Donald B. Paschburg; F. Chau & Associates, LLC

(57) ABSTRACT

A system and method for prioritized transmission of scalable compressed data are provided, the system including a database server for receiving an interactive prioritization request from a client and prioritizing transmission of the compressed data relative to a bin optimization in response to the interactive prioritization request; and the method including receiving an interactive prioritization request from a client, prioritizing transmission of the compressed data relative to the bin optimization in response to the interactive prioritization request and transmitting the prioritized compressed data to the client.

21 Claims, 14 Drawing Sheets

PRIORITIZED IMAGE VISUALIZATION FROM SCALABLE COMPRESSED DATA

CROSS-REFERENCE TO RELATED APPLICATIONS

This application claims the benefit of U.S. Provisional Application Ser. No. 60/545,550, filed Feb. 17, 2004 and entitled "Interactive Client-Server Transmission of Compressed Data with Prioritization by Scene Content", which is incorporated herein by reference in its entirety. In addition, this application is a continuation-in-part of U.S. patent application Ser. No. 10/100,154, filed Mar. 18, 2002 now U.S. Pat. No. 7,190,836 and entitled "Efficient Ordering of Data for Compression and Visualization", which is incorporated herein by reference in its entirety.

BACKGROUND

Online medical volume databases, such as those maintained by the National Library of Medicine (NLM), for example, have gained in popularity with the increased use of the Internet. Picture Archiving and Communication Systems (PACS) may be used to support such databases. In addition, the use of three-dimensional imaging modalities that generate volumetric data sets is on the rise, including, for example, Magnetic Resonance Imaging (MRI), Ultrasound (US), Computed Tomography (CT), Positron Emission Tomography (PET) and Single Photon Emission Computed Tomography (SPECT).

In general, volumetric data sets are massive. For example, the "Visible Male" data set includes axial scans of the entire body taken at 1 mm intervals at a resolution of 512 by 512 pixels. The whole data set has 1870 cross sections, and consumes about 15 GBytes of voxel data. The "Visible Woman" data set includes cross sectional images at one-third the sampling interval of the "Visible Male" along the axial direction, and consumes about 40 GBytes.

When such data sets need to be transmitted over low-bandwidth networks with varying loads and latency constraints, efficient compression schemes must be employed. The compression scheme should support both lossy and lossless compression. Lossy compression allows the user to trade image quality for reduced bit-rates. On the other hand, there are situations where lossless reconstruction is important, such as where small image details might influence the detection of pathology and could alter the diagnosis. The compression scheme should support eight, 12 and 16 bit signed or unsigned data, which is typical of medical images. In general, it should preferably support arbitrary bit-depths.

The benefit of compression can be significantly enhanced if the entire data set does not have to be decompressed prior to visualization. Hence, it is important for the compressed bit-stream to be scalable. Considering that clients are typically limited in display size, the data transmitted by the server should be scalable by resolution. This enables a client to browse a low-resolution version of the volume and appropriately choose a volume of interest (VOI). Distortion scalability is also of interest, so that the VOI of the client is progressively refined by quality.

In addition, scalability by position or spatial location is desired in interactive applications, where interactive users may wish to view a particular sub-section of the volume. Since rendering time is linear in the size of the data set, the compression technology should be based on a multi-resolution framework, with reduced resolution viewing making it possible to save on compressed data transmitted through the network as well as rendering time.

Numerous techniques for image compression have been proposed, many of them supporting some of the scalability constraints mentioned above. Popular techniques as known in the art include embedded zero-tree wavelet coding (EZW) and Set Partitioning in Hierarchical Trees (SPIHT), both of which are wavelet-coding schemes. The JPEG2000 standard, for example, permits the ordering of bits in the compressed data stream to suit the goal.

A common method for visualizing the data set is to use volume rendering. Volume rendering uses a transfer function that maps from voxel intensity values to color and opacity values. What is currently needed is an improved technique for prioritized image visualization from scalable compressed data.

SUMMARY

These and other drawbacks and disadvantages of the prior art are addressed by a system and method for prioritized image visualization from scalable compressed data.

A system embodiment includes a database server for receiving an interactive prioritization request from a client and prioritizing transmission of the compressed data relative to a bin optimization in response to the interactive prioritization request.

A corresponding method embodiment includes receiving an interactive prioritization request from a client, prioritizing transmission of the compressed data relative to the bin optimization in response to the interactive prioritization request and transmitting the prioritized compressed data to the client.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches prioritized image visualization from scalable compressed data in accordance with the following exemplary figures, in which.

DETAILED DESCRIPTION OF PREFERRED EMBODIMENTS

Figure 1:
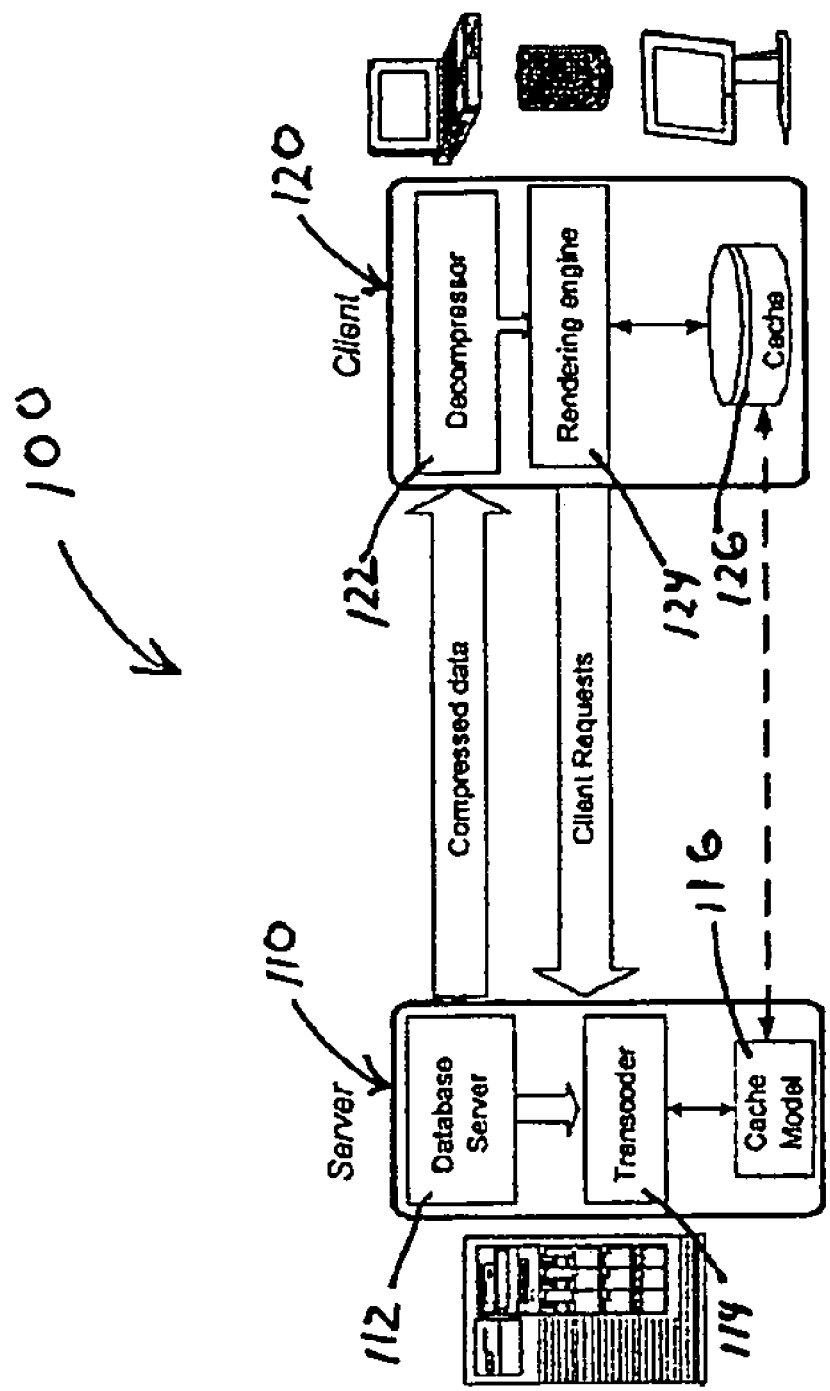
FIG. 1 shows a schematic diagram of a client-server model in accordance with an exemplary embodiment of the present disclosure.

A system and method for prioritized image visualization from scalable compressed data are provided. A variety of visualization schemes may be employed to visualize voxel data. Depending on the visualization scheme and the visualization parameters, such as viewpoint and the like, only a certain segment of the data may ultimately contribute to the rendered output. Therefore, an intelligent server embodiment prioritizes the compressed data packets based on their potential contributions to the rendered display output.

Volume rendering of compressed three-dimensional (3D) data using the JPEG standard has been previously addressed. A drawback of the JPEG standard is that it is based on a Discrete Cosine Transform (DCT) scheme that exhibits a lack of richness in terms of scalability. JPEG2000 has been extended in Part 2 of the standard to provide a specification of the Discrete Wavelet Transform (DWT) along the component direction.

An exemplary embodiment of the present disclosure uses scalable compressed data compliant with the JPEG2000 standard. Other types of scalable compressed data may be used in alternate embodiments, such as data compliant with the proposed MPEG Scalable Video Coder (MPEG SVC), and the like.

As an image compression standard, JPEG2000 is highly scalable and supports the extension of two-dimensional (2D) algorithms to support volumes. For example, a three-dimensional (3D) reversible integer wavelet transform combined with EZW has been proposed to achieve lossless compression, while 3D-SPIHT has been employed elsewhere.

One of the requests of telemedicine is to enable remote visualization and browsing of medical volumes. Thus, there is a need to employ scalable compression schemes and efficient client-server models to obtain interactivity and an enhanced viewing experience. Embodiments of the present disclosure include schemes that use JPEG2000 and JPIP (JPEG2000 Interactive Protocol) to transmit data in a multi-resolution and progressive fashion. The server exploits the spatial locality offered by the wavelet transform and packet indexing information to transmit compressed volume data relevant to a client's particular query. Once the client identifies its volume of interest (VOI), the volume is refined progressively within the VOI from a lossy up to a final lossless representation. Contextual background information can also be provided with a quality fading away from the VOI.

A prioritization enables the client to progressively visualize scene content from a compressed file. In an exemplary embodiment, the client makes requests to progressively receive data corresponding to any particular tissue type. The server is now capable of re-ordering the same compressed data file on the fly to serve data packets prioritized as per the client's request.

As a result, the interactive user has the freedom to browse and render any sub-section of the volume at variable resolution with varying levels of visual quality, and is also able to visualize any arbitrary set of tissue types with enhanced quality. The resulting system embodiment is ideally suited for bandwidth-constrained systems having compressed volume data on a server that is to be browsed by a client.

As shown in FIG. 1, a client-server model is indicated generally by the reference numeral 100. The client-server 100 includes a server 110 and a client 120 in signal communication with the server. The server 110 includes a database server 112, a transcoder 114 in signal communication with the database server, and a cache model 116 in signal communication with the transcoder. The client 120 includes a decompressor 122, a rendering engine 124 in signal communication with the decompressor, and a cache 126 in signal communication with the rendering engine.

Figure 2:
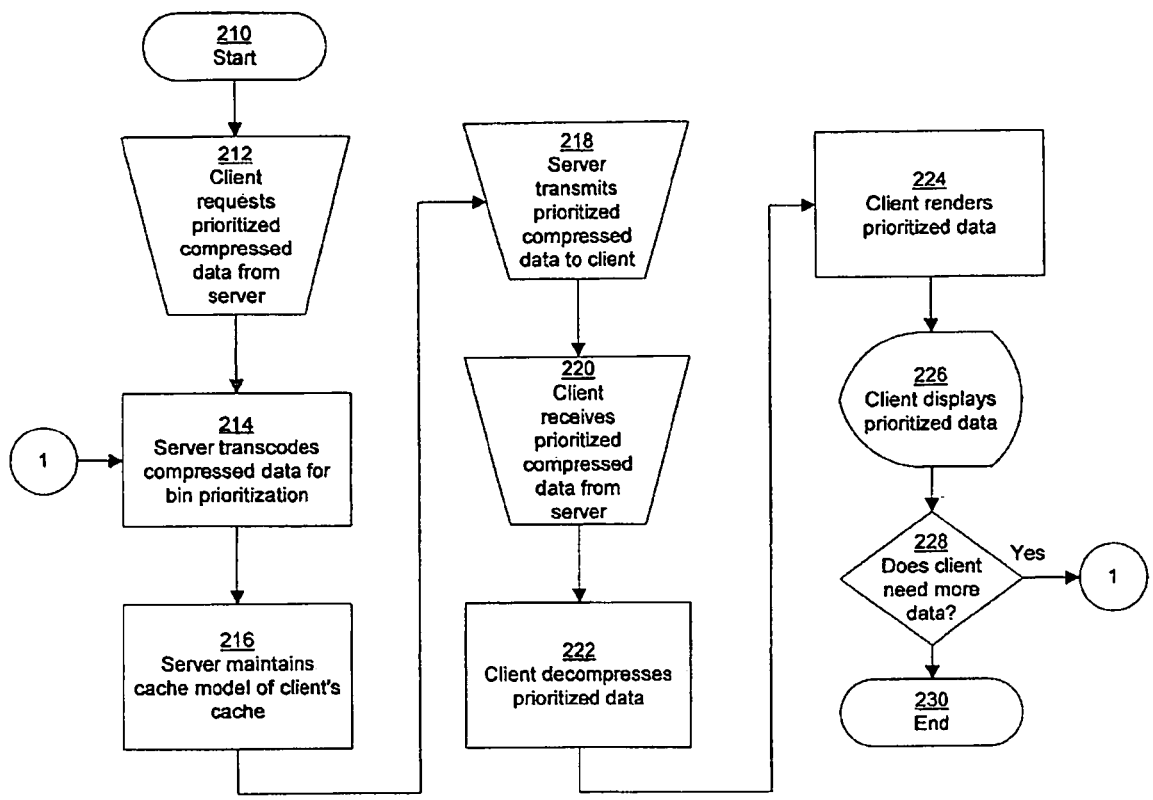
FIG. 2 shows a flowchart diagram for prioritized image visualization from scalable compressed data in accordance with an exemplary embodiment of the present disclosure.

Turning to FIG. 2, a method for prioritized image visualization from scalable compressed data is indicated generally by the reference numeral 200. The method 200 includes a start block 210 that passes control to an input/output (I/O) block 212. At the block 212, a client requests prioritized compressed data from a server, and control is passed to a function block 214. At the block 214, the server transcodes the compressed data for bin prioritization, and control is passed to a function block 216. At the block 216, the server maintains its cache model of client's cache, and control is passed to an I/O block 218. At the block 218, the server transmits prioritized compressed data to the client, and control is passed to an I/O block 220.

At the I/O block 220, in turn, the client receives the prioritized compressed data from the server, and control is passed to a function block 222. At the function block 222, the client decompresses the prioritized data, and control is passed to a function block 224. At the function block 224, the client renders the prioritized data, and control is passed to a display block 226. At the block 226, the client displays the prioritized data, and control is passed to a decision block 228. The block 228 determines whether the client requires more data, and if so control is passed back to the function block 214. On the other hand, if the client does not require more data, control is passed to an end block 230.

Figure 3:
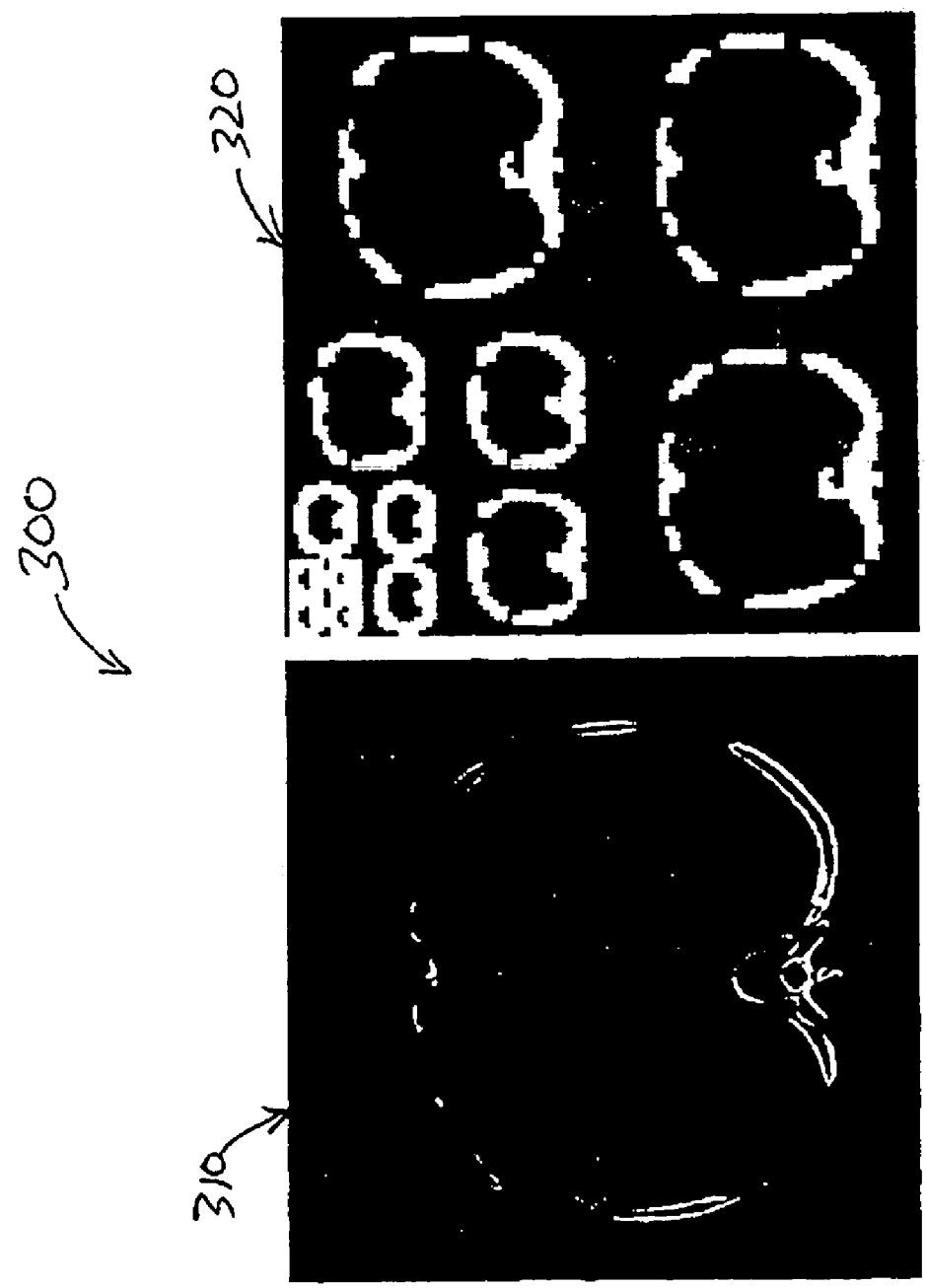
FIG. 3 shows a graphical diagram of bin and code-block masks in accordance with an exemplary embodiment of the present disclosure.

Turning now to FIG. 3, masks of bone data from a slice of a volumetric data set are indicated generally by the reference numeral 300. The masks include a bin mask 310 and a code-block mask 320, showing the relevant code-blocks on the sub-band domain. Four levels of transform were applied along the x, y and z directions to obtain the masks.

Figure 4:
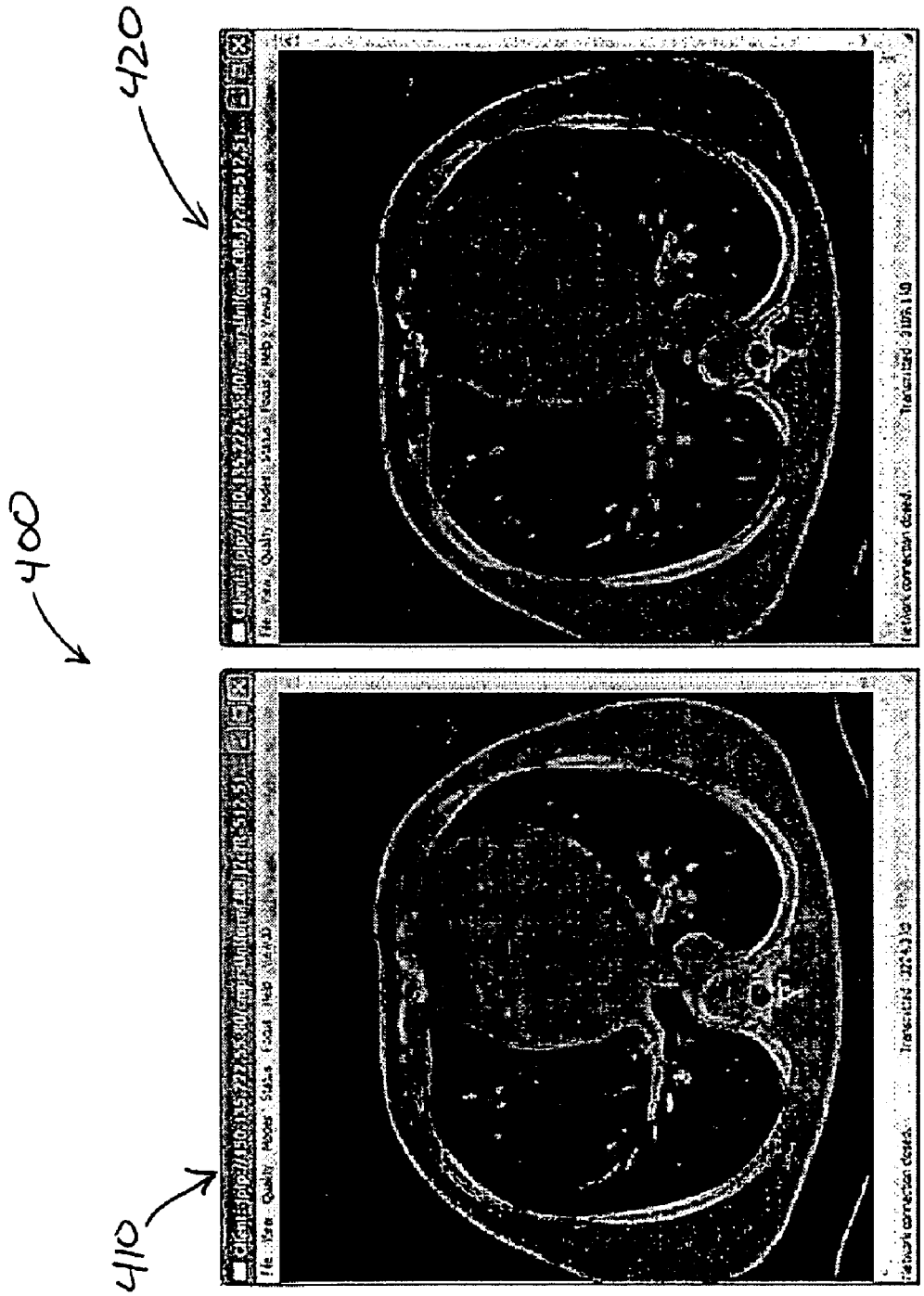
FIG. 4 shows a graphical diagram of comparative volume slices including a slice with bin-optimized delivery in accordance with an exemplary embodiment of the present disclosure.

As shown in FIG. 4, volume slices illustrating the effect of bin-optimized delivery are indicated generally by the reference numeral 400. One slice 410 without bin-optimized delivery and another slice 420 with bin-optimized delivery are displayed at a stage when roughly the same amount of compressed data, or about 3 MBytes, has been transmitted from the same compressed file by the server. The common compressed file contains 256 slices, compressed with four levels of transform along the three dimensions. In this case, the bone was requested by the client. All slices were transmitted by the server and decompressed by the client, with relevant precincts transmitted with higher fidelity. In the slice 420, the regions corresponding to the bone have a higher visual quality at the cost of a poorer visual quality in the regions at the center.

Figure 5:
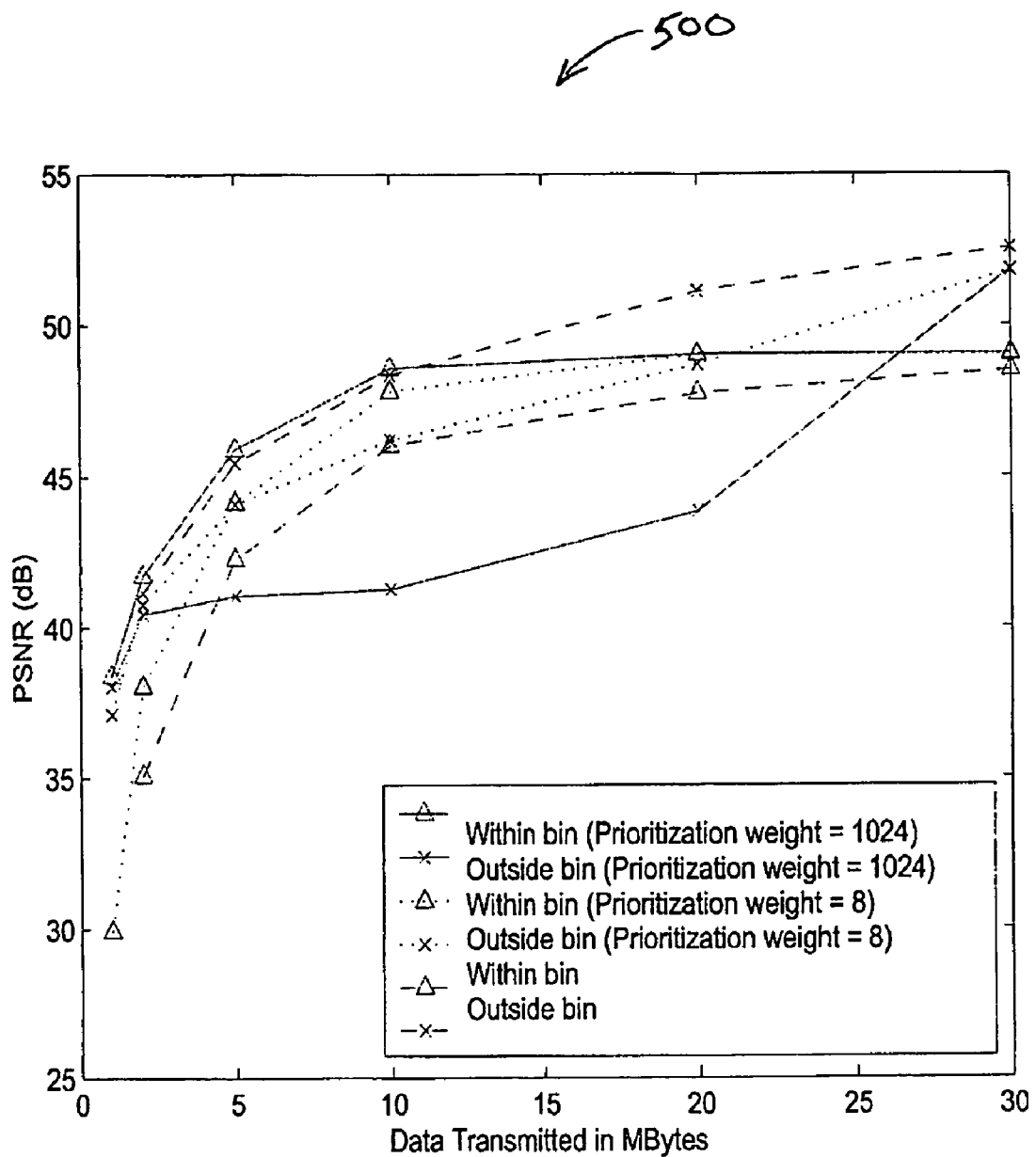
FIG. 5 shows a graphical diagram for peak signal-to-noise ratios (PSNR) as a function of the data transmitted by the server with and without bin-optimized delivery in accordance with an exemplary embodiment of the present disclosure.

Turning to FIG. 5, peak signal-to-noise ratios (PSNR) are indicated generally by the reference numeral 500. PSNR is shown as a function of the data transmitted by the server with and without bin-optimized delivery. The PSNR within the bin is significantly higher with bin-optimized delivery. The PSNR outside the bin is also shown. The precinct size chosen was 16×16. The code-block size chosen was 8×8.

Figure 6:
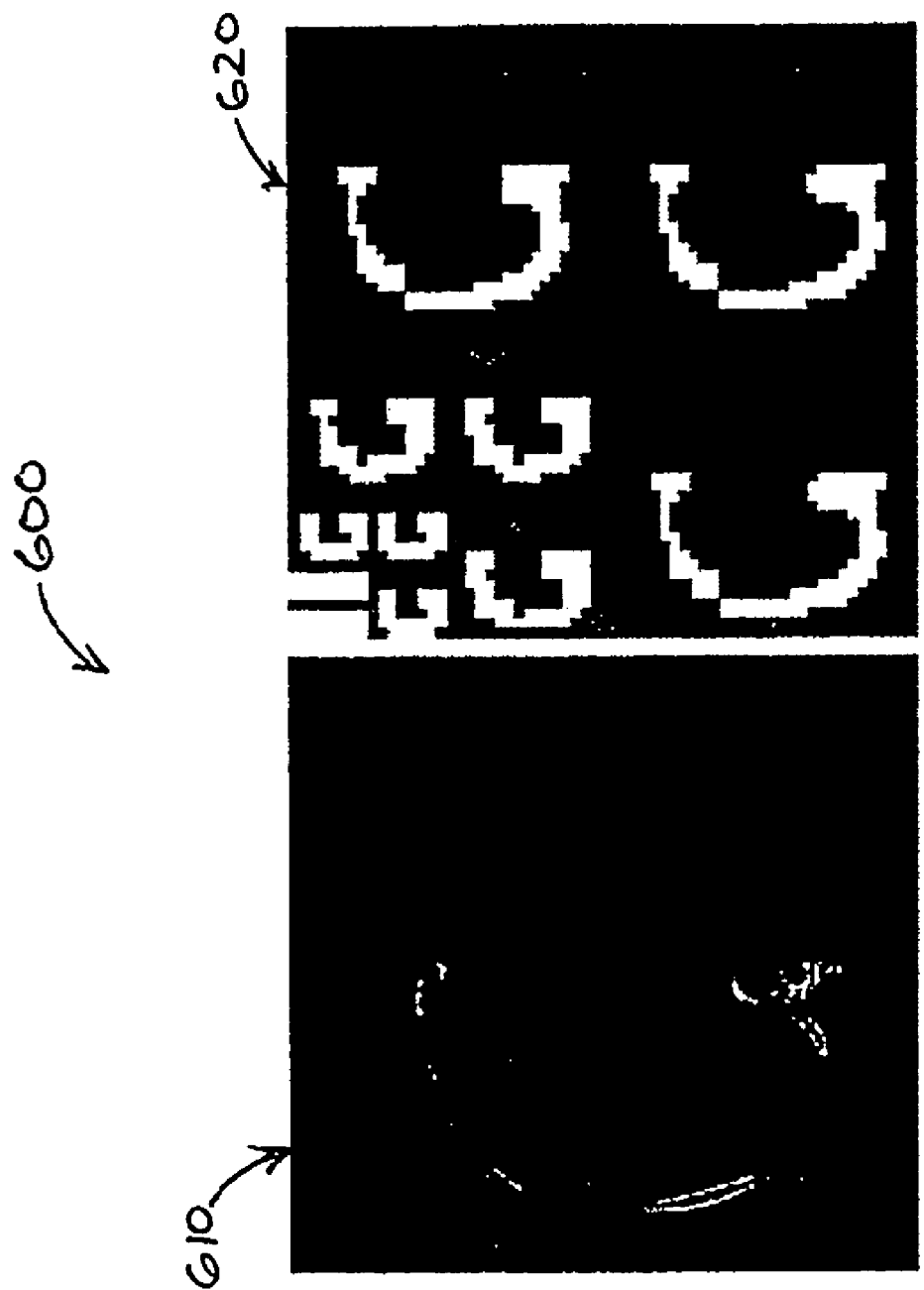
FIG. 6 shows a graphical diagram for a bin mask and a code-block mask corresponding to the bin mask in accordance with an exemplary embodiment of the present disclosure.

Turning now to FIG. 6, masks confined to the left half of the volume are indicated generally by the reference numeral 600. A bin mask 610 corresponds to bone confined to the left half of the volume, and a code-block mask 620 corresponds to the bin mask.

Figure 7:
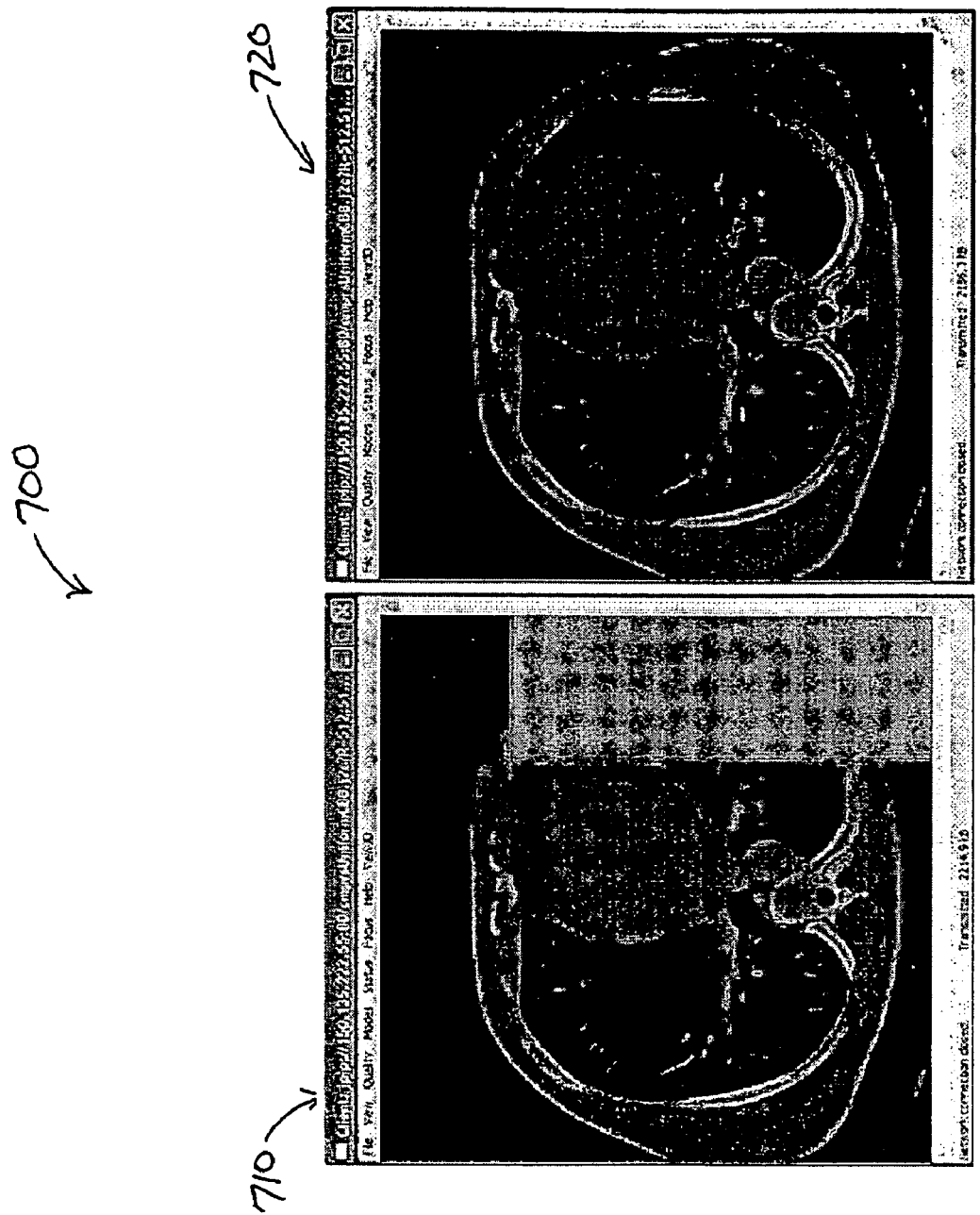
FIG. 7 shows a graphical diagram for prioritized delivery using the bin-mask of FIG. 6.

As shown in FIG. 7, results for prioritized delivery using the bin-mask 610 of FIG. 6 are indicated generally by the reference numeral 700, where the result 710 corresponds to weights wb=2048 on all sub-bands, and the result 720 corresponds to weights of wLL4=2048 and wb=1024 on the other sub-bands. The result 720 has reduced blockiness due to increased emphasis of the entire LLDxy band.

Figure 8:
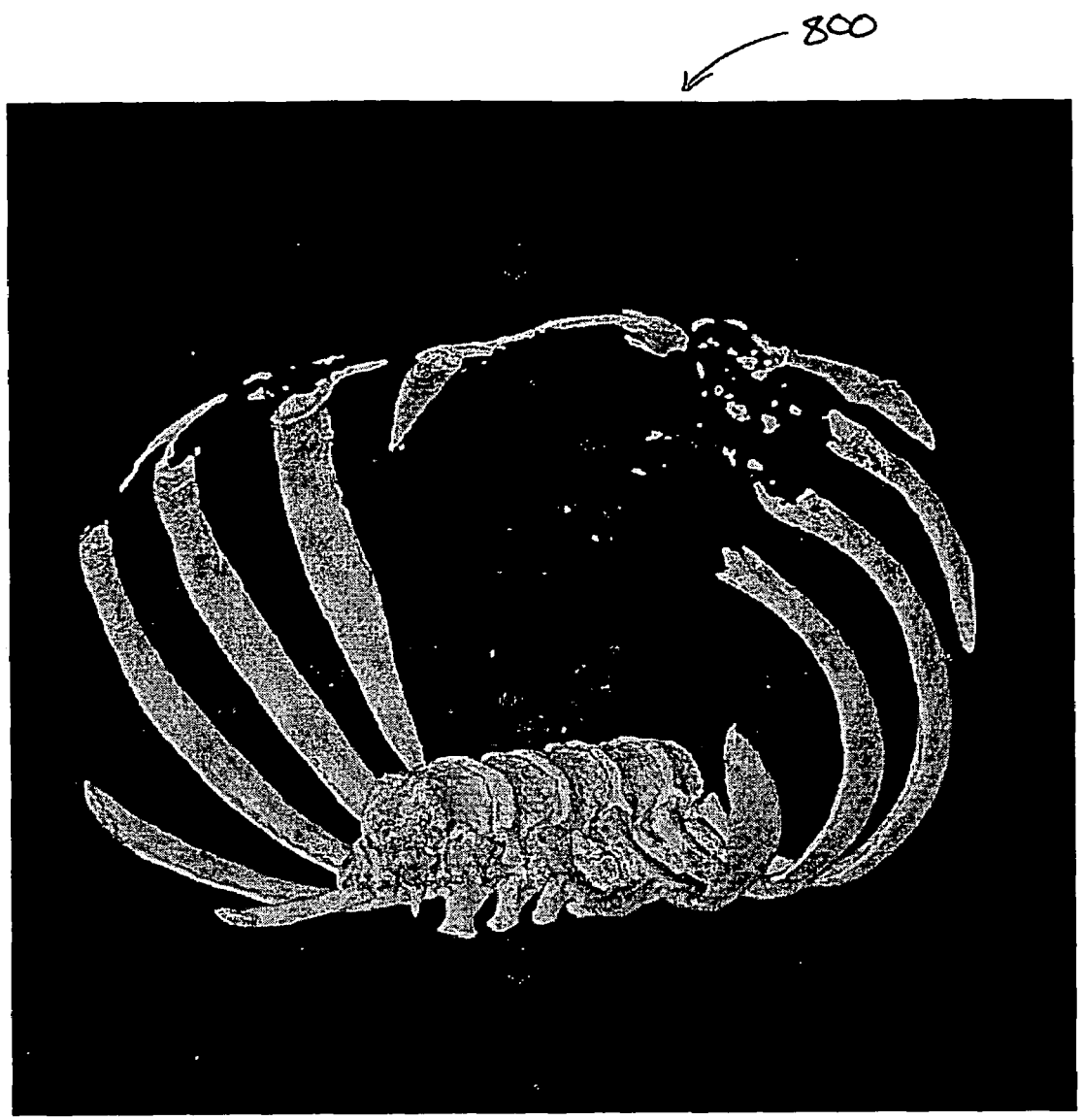
FIG. 8 shows a graphical diagram for bone rendered from an uncompressed volume.

Turning now to FIG. 8, bone rendered after the complete uncompressed volume has been received by the client is indicated generally by the reference numeral 800.

Figure 9:
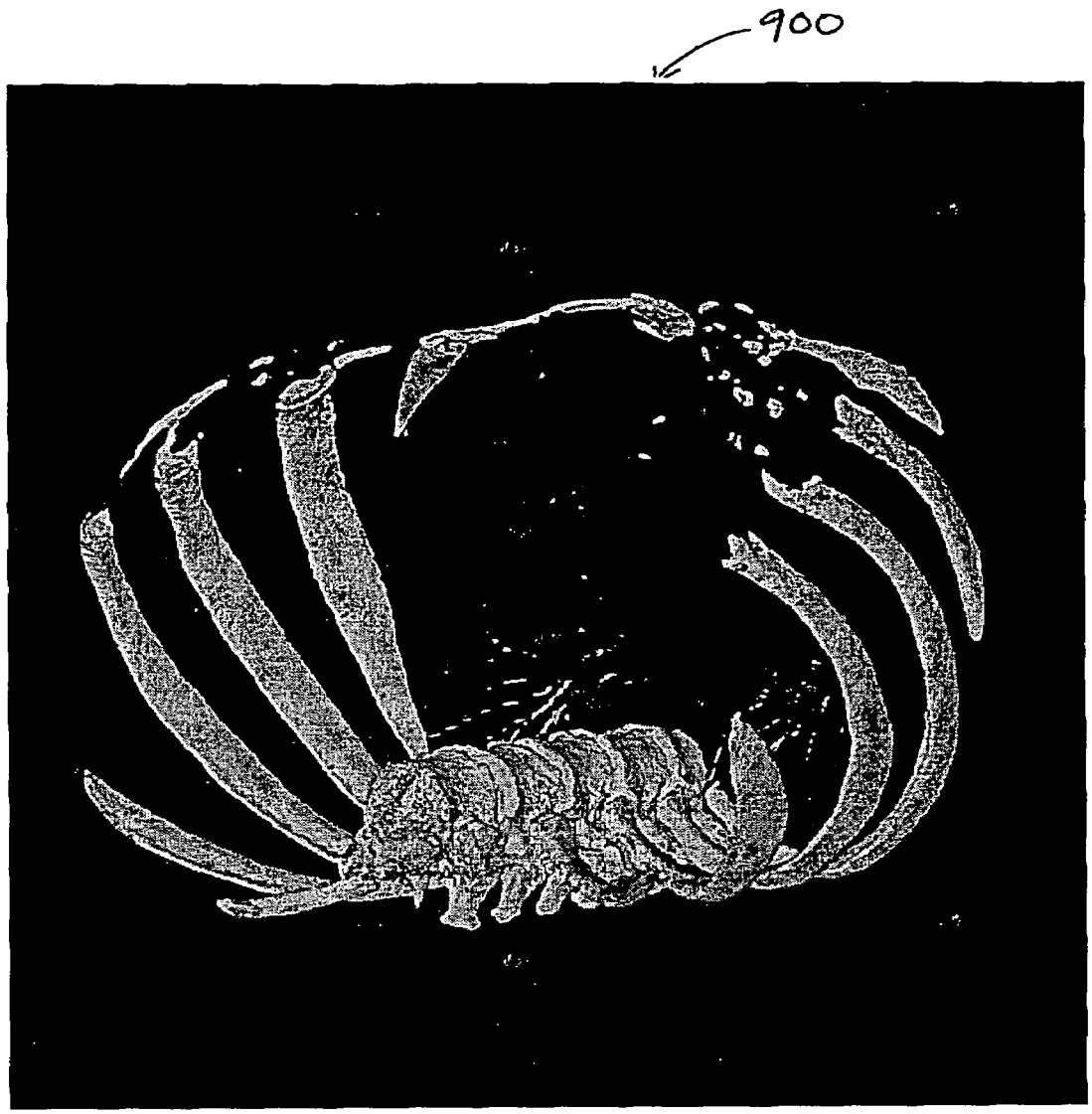
FIG. 9 shows a graphical diagram for bone rendered after 1.5 MB of prioritized transmission for the bone bin in accordance with an exemplary embodiment of the present disclosure.

As shown in FIG. 9, bone rendered after 1.5 MB of prioritized transmission for the bone bin has been received by the client is indicated generally by the reference numeral 900. Here, the observed PSNR values for the bone, background and the entire volume are 40.25, 40.15 and 40.15 dB, respectively.

Figure 10:
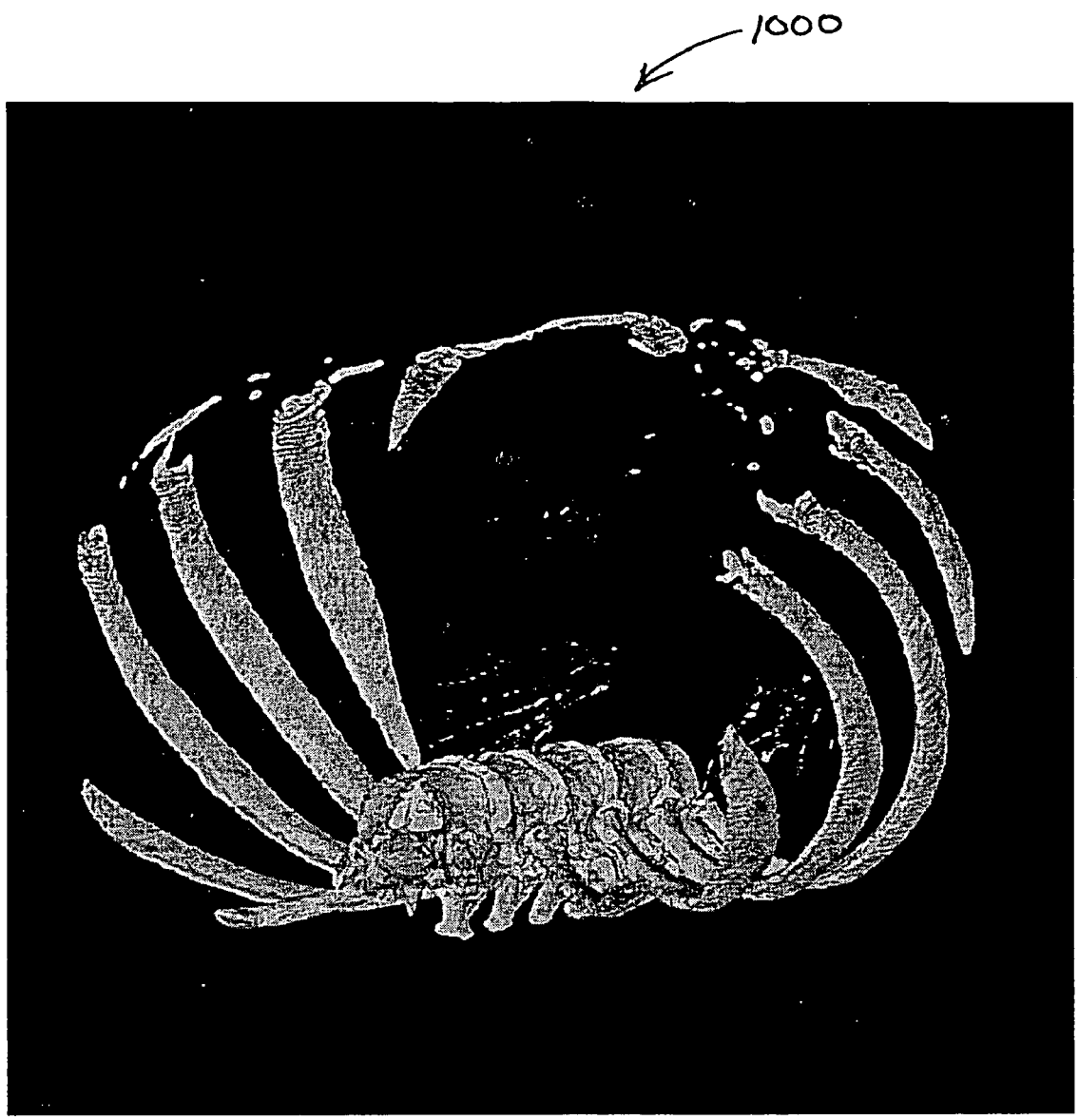
FIG. 10 shows a graphical diagram for bone rendered after 1.5 MB of default non-prioritized transmission.

Turning to FIG. 10, bone rendered after 1.5 MB of default or non-prioritized transmission has been received by the client is indicated generally by the reference numeral 1000. Here, the observed PSNR values for the bone, background and the entire volume are 34.05, 40.72 and 40.51 dB, respectively.

Figure 11:
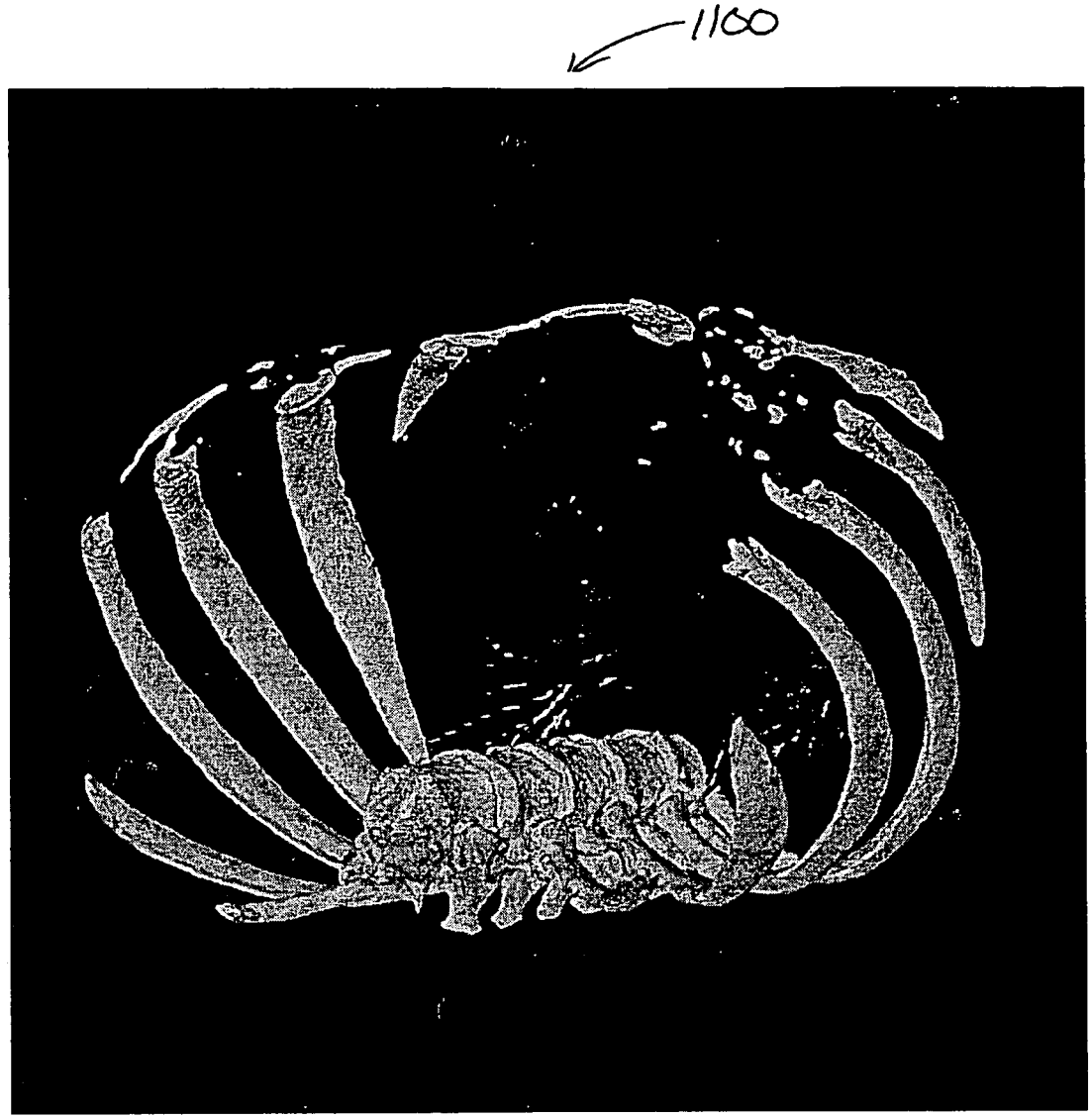
FIG. 11 shows a graphical diagram for bone rendered after 2 MB of prioritized transmission for the bone bin in accordance with an exemplary embodiment of the present disclosure.

Turning now to FIG. 11, bone rendered after 2 MB of prioritized transmission for the bone bin has been received by the client is indicated generally by the reference numeral 1100. Here, the observed PSNR values for the bone, background and the entire volume are 41.73, 40.44 and 40.46 dB, respectively.

Figure 12:
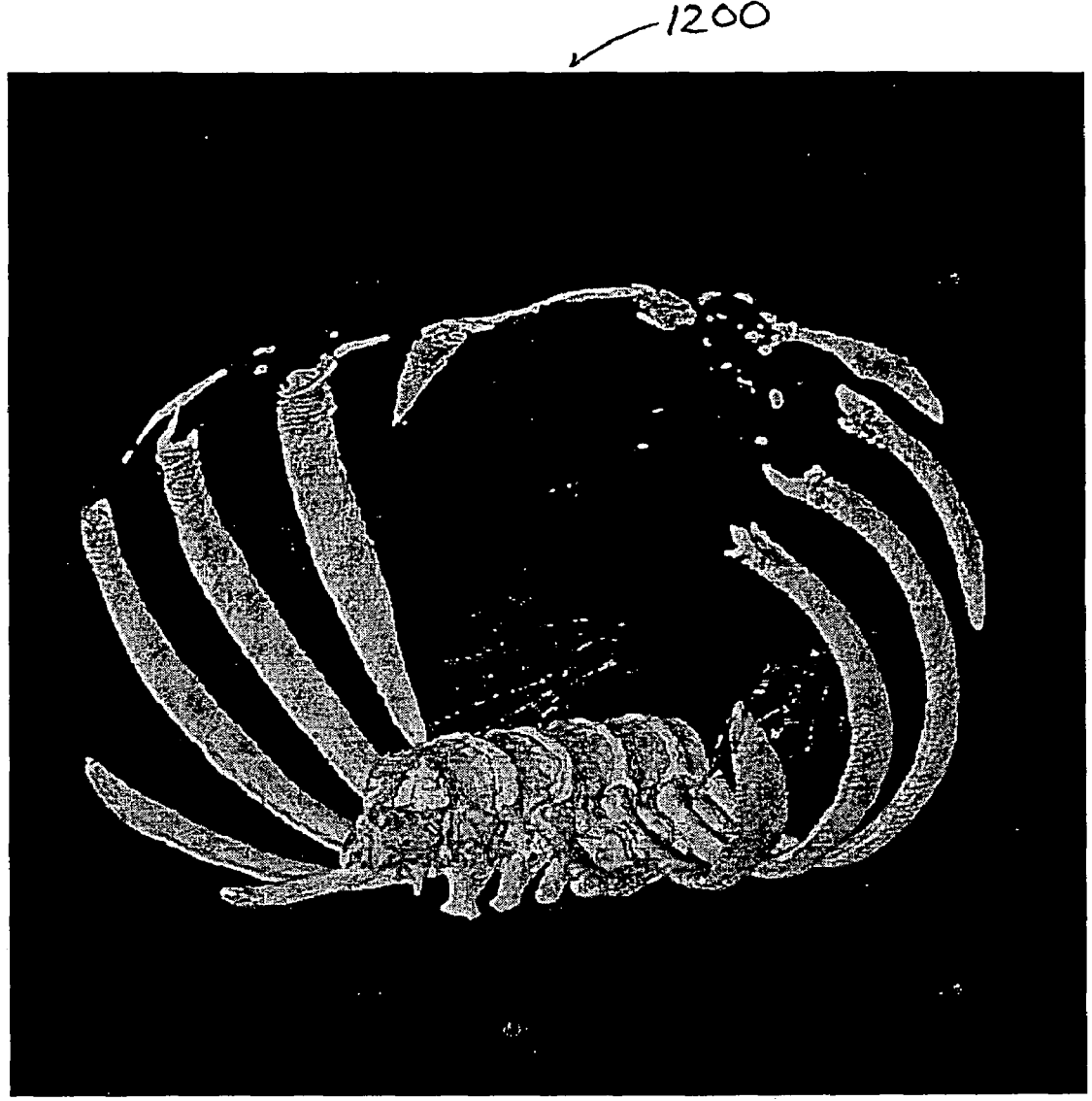
FIG. 12 shows a graphical diagram for bone rendered after 2 MB of default non-prioritized transmission.

As shown in FIG. 12, bone rendered after 2 MB of default or non-prioritized transmission has been received by the client is indicated generally by the reference numeral 1200. Here, the observed PSNR values for the bone, background and the entire volume are 35.06, 41.16 and 35.08 dB, respectively.

Figure 13:
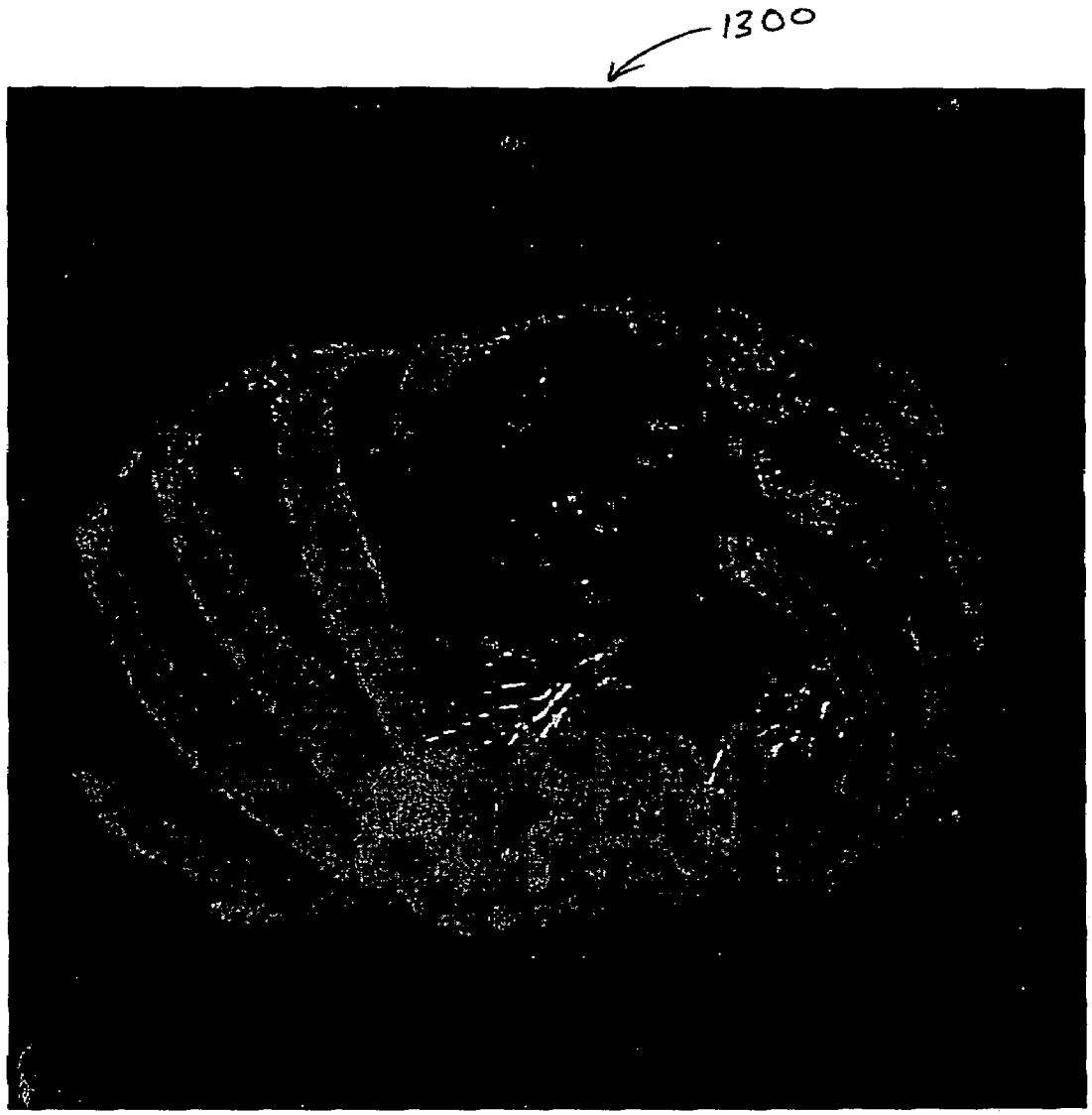
FIG. 13 shows a graphical difference diagram between FIGS. 11 and 8.

Turning to FIG. 13, a difference image between the renderings 1100 of FIGS. 11 and 800 of FIG. 8 is indicated generally by the reference numeral 1300. This is the difference between 2 MB of prioritized transmission versus the whole uncompressed data set.

Figure 14:
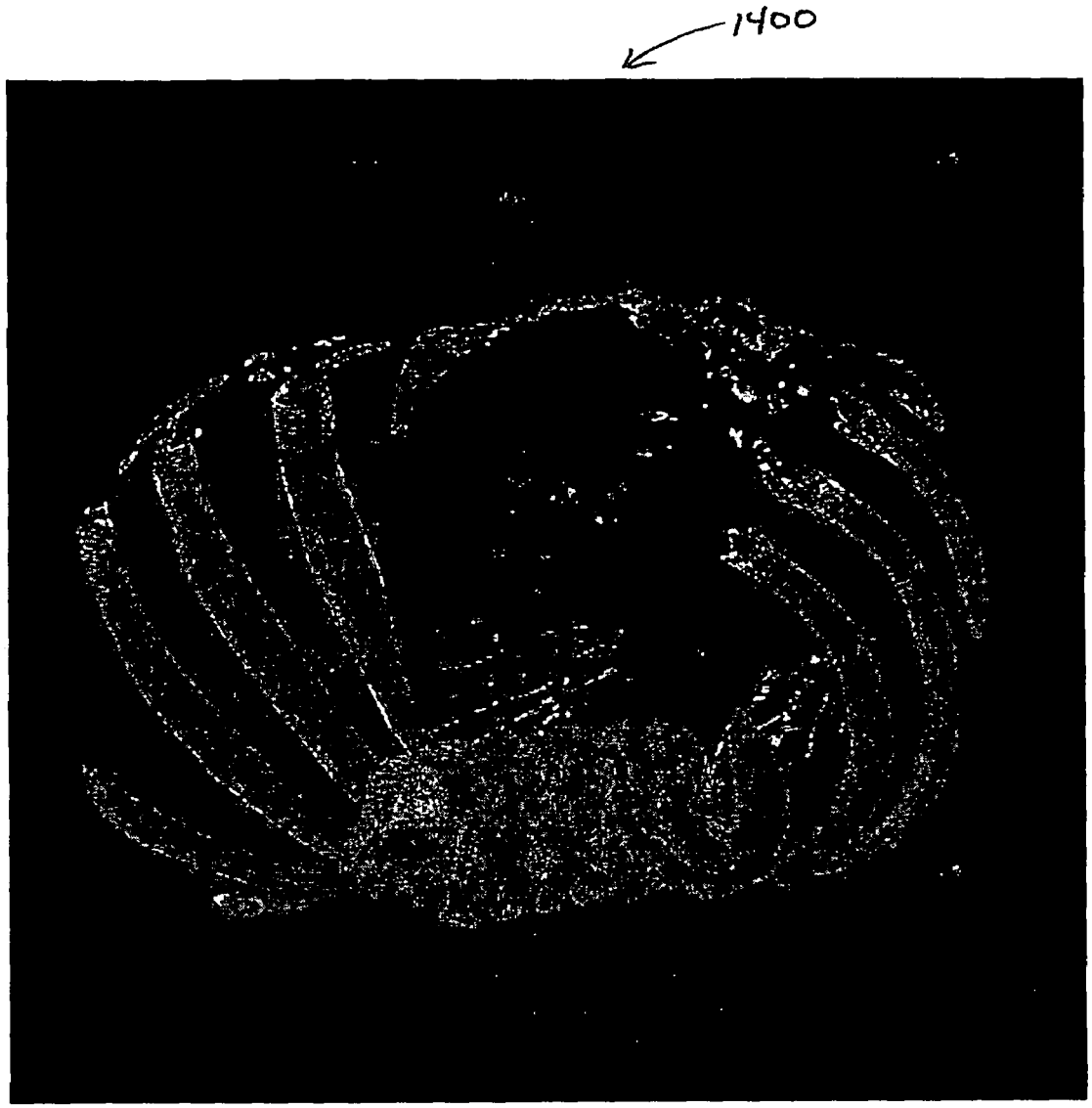
FIG. 14 shows a graphical difference diagram between FIGS. 12 and 8.

Turning now to FIG. 14, a difference image between the renderings 1200 of FIGS. 12 and 800 of FIG. 8 is indicated generally by the reference numeral 1400. This is the difference between 2 MB of default or non-prioritized transmission versus the whole uncompressed data set.

In operation, volumetric data sets may be quite large, so memory and disk caching schemes are used to improve performance. Thus, the client 120 of FIG. 1 maintains a cache 126 of data transmitted by the server, and is able to delete elements from the cache once they are outside the VOI of an interactive user. The server, in turn, maintains the model 116 of the client's cache, to avoid resending any elements that the client already has in its cache. The need for the server to be aware of the client's cache contents is particularly important in wavelet based compression schemes, since even two VOI's can have significant overlap of compressed data. In addition, the communication protocol allows the client to communicate its cache state to the server.

The communication protocol between the client 120 and the server 110 preferably employs a generic protocol that is easily deployed on a variety of channels. The client-server protocol is transport neutral, and each packet returned by the server is a self-contained unit. This feature stems from the fact that packets may be received out of order and that the client should not have to wait to improve its cache. Such a scheme becomes increasingly important when transport protocols with very few error recovery services and/or high packet erasure channels are employed. In such cases, absence of such a self-contained scheme would mean that the client would have to wait until the server resent lost packets.

In operation of the client-server model 100 of FIG. 1, volumetric data sets may be stored and maintained by the database server 112, so that one or more remote clients 120 can browse the data sets interactively. A client may be a low-end workstation with limited bandwidth, memory and processing power. One of the fundamental needs of a client is breadth in terms of interactivity under a variety of network conditions. For example, an interactive user may need reduced resolution viewing, the ability to view a select subsection of the volume, and the ability to pan, zoom, and view select slices, all with a pleasant and real-time viewing experience exhibiting immediate and progressive refinement of the view volume. A user is generally willing to initially sacrifice some rendering quality or field of view in exchange for real-time performance. A user, such as a radiologist or clinician, may also need to browse the data set slice by slice or to visualize the volume to get an overview.

In the masks of bone data 300 of FIG. 3, which are from a slice of a volumetric data set, the bin mask 310 yields the code-block mask 320, which, in turn, shows the relevant code-blocks on the sub-band domain. Four levels of transform were applied along the x, y and z directions to obtain the masks.

The fundamental volume visualization algorithms are of two types: direct volume rendering (DVR) algorithms and surface-fitting (SF) algorithms. DVR includes approaches such as ray-casting and splatting. The disadvantage with DVR is that the entire data set must be traversed for each rendered image. Sometimes a low-resolution image is quickly created to check the volume and then refined, which is called "progressive refinement". SF methods fit iso-surfaces, such as planar polygons or surface patches, to constant-value contour surfaces. SF methods are usually faster than DVR methods, since they traverse the data set once for a given threshold value. New views of the surface can be quickly generated. However, using a new SF threshold is time consuming since the cells must be revisited to extract new surfaces.

Data classification may involve choosing a scalar threshold value for SF algorithms, or choosing opacity values for DVR algorithms. An opacity transfer function is used to expose the relevant segments and to make transparent the uninteresting ones. For data acquired from CT scanners, the pixel intensity generally determines the tissue type. Hence, scalar voxel values can play a key role in determining the compressed data of interest to an interactive client.

To identify scalar values in the code-stream, the scalar range of the volume data is divided into bins, where each bin represents the intensity range to which a particular tissue is confined. Bins are generally not uniformly spaced. Each voxel is assigned to a particular bin, or may remain unassigned. The compressed volume data corresponding to each bin is identified. For each bin, a bin mask is generated, such as the bin mask 310 of FIG. 3. The bin mask is the set of voxels that belong to the bin. Due to the finite spatial extent of the DWT, it is possible to trace each voxel to a set of wavelet coefficients using the footprint of the wavelet kernel used to transform the volume data. This can be done recursively from each resolution to the next lower resolution. In this way, each bin mask, which is defined on the volume data grid, is mapped to a mask on the sub-band grid. This mask is used to identify if a code-block contributes to a bin. The set of code-blocks that contribute to the bin forms a code-block mask on the sub-band grid, such as the code-block mask 320 of FIG. 3.

Thus, the masks 300 of FIG. 3 show the bin mask 310 and the code-block mask 320 for one slice of a volume. This procedure requires negligible computational overhead. The code-block mask is generated during the volume compression and is a one-time expense. Each voxel's bin is determined as it is read. Due to the smearing effects of the wavelet filter, code-block masks may have some overlap. That is, a code-block may affect more than one tissue type. Thus, a bin table is created for identifying the bins on which each code-block bears an influence. A field $b_i$ is included, indicating the percentage of coefficients from the code-block i that contribute to the bin b. This table is stored in a file at the server. This table-file for each bin in the uncompressed form may be represented as a binary volume. One bit is required for each code-block to determine if it contributes to the bin. For a 512×512×256 first exemplary test volume such as a segment of a CT scan of an abdomen, using a code-block size of 8×8, the size of the table-file for a bin was 0.015625 bits/voxel. The table-file can be thought of as a binary mask and can be easily compressed.

One approach to creating a scalable representation would be to simply multiply the distortion-rate slopes of the scalar bin of interest, b, by a weight $w_b$ prior to rate allocation during compression. This would certainly give an enhanced viewing experience for voxels belonging to bin b. However, this creates a pre-defined bin preference in the compressed file. If the client wishes to render another bin, it would require re-compression of the bit-stream. Thus, it is more beneficial to have the server determine and transmit the proper data on the fly from a single compressed code-stream, to provide an enhanced viewing experience in any bin.

Thus, Packet-Length Tile-part (PLAT) marker segments are used in the code-stream to provide random access to packets from the code-stream. Since precinct sizes could have been chosen arbitrarily, and are sometimes large enough to occupy the entire sub-band, the server optionally transcodes the input volume on the fly into one with smaller or resized precincts, which can be as small as the size of the code-block. Transcoding does not consume significant resources since transcoding simply repackages existing code-blocks to conform to smaller precinct sizes, without actually decoding them. A transcoder, such as the transcoder 114 of FIG. 1, thereby provides granularity suitable for interactive visualization.

Prior to delivering the data, the precincts are re-layered into packets to emphasize one or more data bins as chosen by the client. Prior to re-layering, the server determines, from the bin-table, the degree to which each precinct P contributes to the code-block mask $B_b$ for the bin b. This is called the bin-relevance $A_{bu}$ of the precinct P, as defined by Equation 1 of Table 1, where N is the number of code-blocks that make up the precinct P. The field $b_i$ is obtained from the bin-table. The distortion-rate slopes of each packet from the precinct P are then weighted by 1+(abp)(wb). The weight wb determines the level of importance attached to receiving the voxel data corresponding to bin b prior to the rest of the volume. A weight of zero results in the absence of weighting. A weight $w_b$ roughly corresponds to a bit-plane shift of the relevant code-block's sub-band coefficients by log $2w_b$ bitplanes. The apparent or weighted distortion-rate slopes of the packet from precinct P at layer l are given by Equation 2 of Table 1. Hence, the packets are re-assigned to an upper layer l'<l such that Equation 3 of Table 1 is met.

In the volume slices 400 of FIG. 4, illustrating the effect of bin-optimized delivery, one slice 410 without bin-optimized delivery and another slice 420 with bin-optimized delivery are displayed at a stage when roughly the same amount of compressed data has been transmitted from the same compressed file by the server. The regions in the other slice 420, corresponding to the interactively chosen tissue type of bone in this case, have a higher visual quality than those regions in the slice 410. Although the JPIP request syntax itself facilitates the extraction of some regions of interest in the image, they are constrained to be rectangular and would not be applicable in such a case since the bin is scattered over the volume.

The slices 410 and 420 are from an exemplary CT scan of an abdomen after three MBytes of compressed data have been transmitted by the server. The common compressed file contains 256 slices, compressed with four levels of transform along the three dimensions. In this case, the bone was requested by the client. All slices were transmitted by the server and decompressed by the client, with relevant precincts transmitted with higher fidelity. As shown, the white regions of 420 corresponding to the bone of FIG. 3 have a higher visual quality at the allowed cost of a poorer visual quality in the non-bone regions at the center.

The peak signal-to-noise ratios (PSNR) 500 of FIG. 5 compare the progressive increase in PSNR of the bin as data is received by the client, with and without bin-optimized delivery. From the figure, it can be seen that the bin-optimized delivery requires roughly 5 MB data transfer to achieve a PSNR of 46 dB for the data within the bin, whereas 11 MB of data need to be transferred to achieve the same reconstruction quality if bin-optimized delivery is not used. By varying the weight wb, it is possible to obtain a range of prioritizations within the bin.

The PSNRs are a function of the data transmitted by the server with and without bin-optimized delivery. The PSNR within the bin is significantly higher with bin-optimized delivery. The PSNR outside the bin is also shown. The precinct size chosen was 16×16. The code-block size chosen was 8×8.

Thus, FIG. 5 shows the gains obtained with two different weights, 1024 and 8. Higher weights lead to larger gains. It must be emphasized here that data delivery is optimized based on scene content. If it is known, a priori, that bone was the only tissue of interest, the server could have segmented bone out and compressed it in separate file and this would require far less data transmission than the schemes mentioned here. However, the present exemplary application requires that the client have the flexibility to select any type of tissue or segmentation.

The server can transcode larger precinct sizes into smaller dimensions in order to increase the granularity for interactive bin delivery. However, this granularity is associated with a slight packaging overhead. A packet is the fundamental unit of transmission. Each packet is preceded by a packet header that helps identify its contribution to the code-stream. For a volume with a large number of slices, the net size of the packet headers can also play a minor role. If the intent is to transmit the entire volume, it is clear that larger precinct sizes would be more effective. Smaller precinct sizes result in more packets and hence a large total packet header size. To optimize data delivery within the bin, smaller precinct dimensions give higher PSNR values within the bin, since smaller precincts can provide a more compact representation of the bin. Table 2 shows the effect of transcoding to smaller precinct sizes. The code-block size chosen was 8×8. The PSNRs are tabulated for precinct sizes of 16, 32 and 64 for the two exemplary cases.

The PSNR with bin-optimized delivery is higher in the bin of interest, at the calculated cost of a reduction in PSNR for regions away from the bin. If the bin is confined to a small spatial region, the client may see blocky artifacts during the initial stages of the browsing session. This does not happen in the results 400 of FIG. 4 because the smearing effects of the filter result in almost the entire LLDxy band being weighted.

The bin mask of bone 610, confined to the left half of the volume, and the code-block mask 620 corresponding to the bin mask were introduced with respect to FIG. 6. If a bin consists of bone tissue on the left half of the volume, as in FIG. 6, one could end up with blocky artifacts as shown in 710 of FIG. 7. Thus, a more pleasant browsing experience may be obtained by reducing the weight web to an appropriate value. In addition, a weight function web(cbi) may be applied that progressively decays from the most relevant to the least relevant bins. Alternatively, a simpler solution would be to weight all of the code-blocks in the LLDxy band with w LLDxy>max(wb) or weight a few low-resolution bands. 700 of FIG. 7 shows the reduction in blockiness obtained by weighting the entire LLDxy band.

Rendered images are compared by applying the prioritization scheme to bone in the exemplary embodiment. FIG. 8 is rendered from an uncompressed 512×512×256 (xyz) section of the abdomen. FIGS. 9 through 12 compare the renderings from 1.5 MB and 2 MB of prioritized and uniform transmissions. The differences in the quality of the rendered output are seen in the form of a coarser texture and the presence of additional holes in the absence of prioritization. FIGS. 13 and 14 show the difference images of the prioritized and the default schemes against the original renderings. It can be seen that the difference map in the prioritized case is much less dense than in the non-prioritized case, illustrating the improvement obtained in the renderings for the client.

The scheme described above can be used for volume rendering and yields good performance for slice based viewing. However, further improvements can be obtained in the volume rendered case. To achieve such improvement, the bin-table is no longer generated during compression since the improved bin-table will be dependent on the viewpoint of the interactive user, which may vary. A generic ray-caster casts rays through the volume, processing the scalar voxel values along the ray according to a ray function. Most ray functions use an alpha compositing technique, which treats the values along the ray as samples of opacity accumulated per unit distance. The relevance measure, abp should then be a function of the accumulated opacity along the ray as it passes through each code-block. The server may also take advantage of early ray termination.

Once the opacity reaches the occlusion threshold, subsequent bin-relevance values along the ray may be set to zero. Prioritization in this case is carried out by both the client and the server. The server prioritizes regions of the volume based on opacity for bin-optimized delivery, while the client prioritizes regions of the volume based on visibility. The visibility relevance measures may be computed by the client once the lowest resolution has been decompressed. Rate-distortion optimized delivery for the bins can then be applied to the subsequent higher resolution sub-bands. As the higher resolution data becomes available at the client, the bin-table may be further refined. A wavelet based visualization scheme has been proposed, where the prioritization is entirely carried out by the client and expressed in terms of refined client requests based on visibility estimates from a lower resolution.

The disclosed techniques can be applied to many appearance-based image transmission and storage problems in addition to medical images. Alternate examples include automatic object detection on assembly lines by machine vision, human face detection in security control, and the like. As shall be recognized by those of ordinary skill in the pertinent art, the term "image" as used herein may also represent three-dimensional, four-dimensional, and higher dimensional data sets in alternate embodiments.

It is to be understood that the teachings of the present disclosure may be implemented in various forms of hardware, software, firmware, special purpose processors, or combinations thereof. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

TABLE 1

$$\alpha_{bp} = \frac{1}{N}\sum_{i=0}^{N-1} \rho_{bi} \quad \text{(Eqn. 1)}$$

$$s'_{lp} = (1 + \alpha_{bp}w_b)s_{lp} \quad \text{(Eqn. 2)}$$

$$\lambda_{l'+1} < s'_{lp} \leq \lambda_{l'} \quad \text{(Eqn. 3)}$$

TABLE 2

| | | Precinct size p × p | | |
|---|---|---|---|---|
| | | 16 | 32 | 64 |
| PSNR with bin-optimized delivery (dB) | Bone | 48.5336 | 48.1589 | 47.2337 |
| | Rest of the volume | 41.2619 | 44.9162 | 49.1307 |
| PSNR without bin-optimized delivery (dB) | Bone | 46.0163 | 46.2098 | 46.9384 |
| | Rest of the volume | 48.2976 | 49.2109 | 49.5648 |

What is claimed is:

1. A method for prioritized transmission of scalable compressed data, comprising:
   receiving an interactive prioritization request from a client;
   prioritizing transmission of the compressed data relative to a bin optimization in response to the interactive prioritization request; and
   transmitting the prioritized compressed data to the client.

2. A method as defined In claim 1, further comprising transcoding the scalable compressed data into resized precincts for the bin optimization.

3. A method as defined in claim 1, further comprising:
   providing an interactive prioritization request to a server
   receiving prioritized compressed data from the server;
   decompressing the prioritized data; and
   rendering the decompressed data.

4. A method as defined in claim 3 wherein the compressed data is responsive to a discrete wavelet transform, the method further comprising maintaining a cache responsive to the received prioritized compressed data.

5. A method as defined in claim 4, further comprising maintaining a cache model at the server indicative of the cache responsive to the received prioritized compressed data.

6. A method as defined in claim 3 wherein the rendering is surface rendering, the bin optimization comprising a bin-table generated before, during or after compression of the data.

7. A method as defined in claim 3 wherein the rendering is volume rendering, the bin optimization comprising a bin-table generated after compression of the data.

8. A method as defined in claim 3, further comprising:
   identifying a volume of interest (VOI); and
   progressively refining the volume within the VOI towards an increasingly lossless representation.

9. A method as defined in claim 8 wherein contextual background information is provided with a quality fading away from the VOI.

10. A method as defined in claim 3, further comprising at least one of:
    browsing and rendering any sub-section of the volume at a variable resolution with varying levels of visual quality; and
    visualizing any arbitrary set of tissue types with enhanced quality.

11. A method as defined in claim 3 wherein the communication protocol allows the client to communicate its cache state to the server.

12. A method as defined in claim 1 wherein the interactive prioritization request comprises a request to progressively receive data corresponding to one of a plurality of tissue types.

13. A method as defined in claim 1, prioritizing comprising re-ordering the same compressed data file on the fly to serve data packets prioritized per the request.

14. A method as defined in claim 1 wherein the bin optimization is responsive to a bin mask, the bin mask corresponding to at least one of scalar intensity and opacity, the method further comprising creating a code-block mask responsive to the bin mask, the code-block mask being indicative of the relevant code-blocks on a sub-band domain.

15. A method as defined in claim 14 wherein the code-block mask is responsive to at least one level of transform applied along the x, y and z directions.

16. A method as defined in claim 1, further comprising:
    resizing precincts to a size no smaller than a single code-block; and
    re-layering the resized precincts into packets to emphasize one or more data bins as chosen by the client.

17. A method as defined in claim 16, the bin optimization comprising a bin-table generated during or after data compression, the method further comprising, prior to re-layering, determining from the bin-table the degree to which each precinct contributes to the code-block mask for a bin.

18. A system for prioritized transmission of scalable compressed data, comprising:
    a database server for receiving an interactive prioritization request from a client and prioritizing transmission of the compressed data relative to a bin optimization in response to the interactive prioritization request; and
    transmission means in signal communication with the database server for transmitting the prioritized compressed data to the client.

19. A system as defined in claim 18, further comprising:
    interactive request means for providing an interactive prioritization request to a server;
    receiver means in signal communication with the interactive request means for receiving prioritized compressed data from the server;
    a decompressor in signal communication with the receiver means for decompressing the prioritized data; and
    a rendering engine in signal communication with the decompressor for rendering the decompressed data.

20. "A storage device containing a computer-readable medium, tangibly embodying a program of instructions executable by a computer to perform steps for prioritized transmission of"scalable compressed data, the program steps comprising:
    receiving an interactive prioritization request from a client;
    prioritizing transmission of the compressed data relative to a bin optimization in response to the interactive prioritization request; and
    transmitting the prioritized compressed data to the client.

21. "A storage device containing a computer-readable-"medium as defined in claim 20, the program steps further comprising:
  providing an interactive prioritization request to a server;
  receiving prioritized compressed data from the server;
  decompressing the prioritized data; and
  rendering the decompressed data.

* * * * *

UNITED STATES PATENT AND TRADEMARK OFFICE
CERTIFICATE OF CORRECTION

PATENT NO. : 7,324,695 B2
APPLICATION NO. : 11/057977
DATED : January 29, 2008
INVENTOR(S) : Arun Krishnan et al.

It is certified that error appears in the above-identified patent and that said Letters Patent is hereby corrected as shown below:

On the Title Page, Item (73)
The Assignee is listed as Seimens Medical Solutions USA, Inc. should be Siemens Medical Solutions USA, Inc.

Signed and Sealed this

Sixteenth Day of December, 2008

JON W. DUDAS
*Director of the United States Patent and Trademark Office*